Patented Oct. 9, 1928.

1,687,023

UNITED STATES PATENT OFFICE.

NORMAN G. JOHNSON AND SAMUEL G. BAKER, JR., OF WOODBURY, NEW JERSEY, ASSIGNORS TO E. I. DU PONT DE NEMOURS & COMPANY, OF WILMINGTON, DELAWARE, A CORPORATION OF DELAWARE.

DYNAMITE COMPOSITION.

No Drawing. Application filed July 18, 1927. Serial No. 206,783.

This invention relates to an improvement in dynamite composition having a liquid ingredient as sensitizing agent, and consists essentially in the use of ground popped corn as a new absorbent material for the liquid high explosive ingredient of dynamite.

In recent years, satisfactory dynamites of the Permissible type have been produced with a density corresponding to a weight as low as 125 grams per cartridge 1¼" in diameter and 8" long, or to 180 cartridges of that size per case of 50 pounds. These low density powders were produced by the use of materials, such as bagasse pith (U. S. Pat. to W. R. Swint, No. 1,609,221), pulp made from balsa wood (U. S. Pat. to W. R. Swint, No. 1,594,861), and ground corn stalks (U. S. Pat. to John Marshall, No. 1,614,447). Also, by the use of pithy materials, such as the pith of corn stalks and bagasse, explosive compositions of the Straight dynamite and the ammonia or so-called extra dynamite type having satisfactory velocity and sensitiveness to detonation have been produced with a density corresponding to a weight of less than 168 grams for a cartridge 1¼" in diameter and 8" long, or to more than 135 cartridges of that size per case of 50 pounds. The prior art discloses fully the numerous advantages of low density dynamite compositions of each type.

An example of the Permissible type of dynamite referred to is:—

| | Per cent. |
|---|---|
| Nitroglycerine | 10 |
| Ammonium nitrate | 75 |
| Sodium nitrate | 5 |
| Bagasse pith or ground corn-stalk | 10 |

Examples of the compositions of the Straight and extra or ammonia types of dynamite are respectively:—

| | Per cent. | Per cent. |
|---|---|---|
| Nitroglycerine | 60 | 23 |
| Ammonium nitrate | -- | 52 |
| Sodium nitrate | 20 | 14 |
| Bagasse pith or ground corn-stalk | 7 | 3 |
| Other combustible | 13 | 8 |

This invention has as an object the production of explosive compositions of low density having a smaller proportion of the low density ingredient than it has previously been feasible to use. A further object of our invention is to provide explosive compositions of lower density than it has heretofore been practical to manufacture.

We have discovered that ground popped corn may be substituted for part or all of the carbonaceous non-explosive, absorbent materials commonly used in explosives, thereby producing an explosive composition characterized by its low density and furthermore that a smaller proportion of ground popped corn is required to produce explosives of a given low density than any material heretofore used for the purpose. We have further discovered that by substituting ground popped corn for substantial proportions, or for all, of the combustible absorbents formerly used, we can produce explosive compositions of lower density than heretofore manufactured and having a density corresponding to a weight as low as 113 grams for a cartridge 1¼" in diameter and 8" long, or to 200 cartridges of that size per case of 50 pounds.

By ground popped corn is meant the product obtained from popped corn by any of the well known methods of grinding. By popped corn is meant the product of increased volume obtained by the application of heat to any of the several varieties of maize commonly known as pop-corn (zea everta). For the purposes of our invention, all of the material obtained by the popping and grinding of the popcorn may be used with satisfaction, or, if we desire, the unpopped or partially popped corn appearing with the product of ordinary popping operations, and the high density material comprising the hull of the corn, may be separated and discarded, in which case a superior product of extremely low density is obtained. The ground popped corn as used may be of any desired degree of fineness; however, we prefer to use material the major portion of which passes a 10 mesh screen. The material may be used with the normal proportion of moisture contained after popping, or, as is desirable in certain types of dynamite, it may be further dried.

Our invention is applicable to all non-gelatinous types of explosive compositions. The three main classes are commonly known as Straight dynamites, ammonia or extra dynamites, and Permissible dynamites. The Straight dynamites are commonly produced in several strengths varying from about 20% to about 75% and are used for various kinds of blasting, as priming agent for gelatinous explosives, in special work in which high velocity and sensitiveness to detonation is essential, etc. They usually comprise a liquid explosive ingredient in percentage equal to their grade strength, combustible absorbents, and sodium nitrate. The ammonia or extra dynamites are likewise made in several strengths ordinarily equivalent to the corresponding Straight dynamites, and are used for general blasting operations. They usually comprise a lower percentage of liquid explosive than the grade strength, ammonium nitrate, sodium nitrate and combustible absorbents; for example, the 20% strength powder may have 10% to 15% of liquid explosive and 8% to 15% of ammonium nitrate, and the 60% strength powder may have 25% to 30% of liquid explosive and 45% to 55% of ammonium nitrate. The Permissible dynamites are usually of high grade strength, from 40% to 70%, and are primarily for use in coal mines in which operations there exist the danger of explosions of dust and gas. Usually these dynamites contain relatively low percentages of liquid explosive, from about 8% to 15%, and relatively high percentages of ammonium nitrate, about 60% to 80%, combustible absorbents, and, in many cases, inorganic salts adapted to the reduction of flame temperatures, such as sodium nitrate or sodium chloride.

While our invention is capable of use in many different forms, for the purpose of illustration, we shall confine ourselves to one example each of the compositions which bring out its advantages.

In the compositions having the density heretofore manufactured as cited above, we may use:—

|  | Per cent | Per cent | Per cent |
|---|---|---|---|
| Nitroglycerine | 10 | 60 | 23 |
| Ammonium nitrate | 75 | -- | 52 |
| Sodium nitrate | 5 | 20 | 14 |
| Ground popped corn | 8 | 5 | 2 |
| Other combustible | 2 | 15 | 9 |

For a composition having lower density than heretofore manufactured, we may use:—

| | Per cent |
|---|---|
| Nitroglycerine | 10 |
| Ammonium nitrate | 75 |
| Sodium nitrate | 5 |
| Ground popped corn | 10 |

It will, of course, be understood that we can vary the percentages of materials shown in these examples quite widely and can introduce other ingredients not mentioned without departing from the spirit of the invention, as that is obvious. For example, we may use nitroglycerine or nitroglycol or mixtures thereof, with or without partial substitution of tetranitrodiglycerine, nitrated sugars, nitrocompounds, etc. We may increase the proportion of sodium nitrate appreciably, or we may decrease the proportion or omit it entirely, in which case we may use sodium chloride. Likewise, we may use along with ground popped corn, both high density combustibles, such as corn meal, ivory nut meal, flour, etc., and low density carbonaceous materials, such as bagasse pith, cornstalks, etc.

We claim:—

1. An explosive composition characterized by its low density which comprises a liquid explosive ingredient and ground popped corn.

2. An explosive compsition characterized by its low density which comprises ground popped corn, and more than 8% of liquid explosive ingredient.

2. An explosive composition characterized by its low density which comprises a liquid explosive ingredient and at least 1% of ground popped corn.

4. An explosive composition of the Permissible type characterized by its low density which comprises a liquid explosive ingredient, ammonium nitrate, a non-explosive salt adapted to reduce the flame temperature, and ground popped corn.

5. An explosive composition of the Permissible type which comprises a liquid explosive ingredient, ammonium nitrate, a non-explosive salt adapted to reduce flame temperature, and ground popped corn, said composition having a density such that a 1¼" x 8" cartridge weighs less than 146 grams.

6. An explosive composition of the Permissible type which comprises a liquid explosive ingredient, ammonium nitrate, a non-explosive salt adapted to reduce flame temperature, and ground popped corn, said composition having a density such that a 1¼" x 8" cartridge weighs less than 125 grams.

7. An explosive composition of the Permissible type which comprises a liquid explosive ingredient, ammonium nitrate, a non-explosive salt adapted to reduce flame temperature, and ground popped corn, said composition having a density such that a 1¼" x 8" cartridge weighs about 113 grams.

8. An explosive composition of the straight dynamite type characerized by its low density which comprises a liquid explosive ingredient, sodium nitrate, and ground popped corn.

9. An explosive composition of the Straight dynamite type which comprises a liquid explosive ingredient, sodium nitrate, and ground popped corn, said composition having a density such that a 1¼" x 8" cartridge weighs less than 181 grams.

10. An explosive composition of the ammonia type characterized by its low density which comprises a liquid explosive ingredient, ammonium nitrate, sodium nitrate, and ground popped corn.

11. An explosive composition of the ammonia type which comprises a liquid explosive ingredient, ammonia nitrate, sodium nitrate, and ground popped corn, said composition having a density such that a 1¼″ x 8″ cartridge weighs less than 181 grams.

12. An explosive composition characterized by its low density which comprises a liqiud explosive ingredient and 1% to 20% of ground popped corn.

13. An explosive composition which comprises a liquid explosive and at least 1% of ground popped corn, said composition having a density corresponding to substantially 125 to 240, 1¼″ x 8″, cartridges per 50 pounds of finished explosive.

In testimony whereof we affix our signatures.

NORMAN G. JOHNSON.
SAMUEL G. BAKER, Jr.